United States Patent [19]

Siryj

[11] Patent Number: 4,704,712
[45] Date of Patent: Nov. 3, 1987

[54] LOW-FRICTION SLIDE APPARATUS FOR OPTICAL DISC TRANSLATION STAGE

[75] Inventor: Bohdan W. Siryj, Cinnaminson, N.J.
[73] Assignee: RCA Corporation, Princeton, N.J.
[21] Appl. No.: 748,348
[22] Filed: Jun. 24, 1985
[51] Int. Cl.⁴ .......................... G01N 1/06; G11B 3/38
[52] U.S. Cl. ................................ 369/249; 369/219; 369/255; 384/8; 384/12
[58] Field of Search ...................... 369/249, 255, 219; 384/100, 446, 8, 12; 308/5 R

[56] References Cited

U.S. PATENT DOCUMENTS

| | | | |
|---|---|---|---|
| 3,390,886 | 7/1968 | Rabinow | 369/249 |
| 3,744,858 | 7/1973 | Weichsel | 308/5 R |
| 4,097,895 | 6/1978 | Spong | 358/128 |
| 4,239,239 | 12/1980 | Masterson | 369/249 |
| 4,254,959 | 3/1981 | Masterson | 369/219 |
| 4,455,910 | 6/1984 | Kraft et al. | 384/12 |
| 4,504,935 | 3/1985 | Jansen | 369/32 |
| 4,570,249 | 2/1986 | Malissin et al. | 369/219 |

Primary Examiner—Steven L. Stephan
Attorney, Agent, or Firm—Clement A. Berard, Jr.; William H. Meise

[57] ABSTRACT

A low-friction slide apparatus for use with the translation stage of an optical disc recording/playback system is disclosed. The apparatus includes a rail which is fixed in position. The rail includes porous strips affixed to two orthogonal sides along its longitudinal dimension. A plurality of passages between the rail and the porous strips permits air to be forced outwardly through the pores of the strip material. The slide member, which is movably mounted on the rail, has bearing surfaces adjacent the porous strips attached to the rail. Permanent magnets mounted along these bearing surfaces maintain an attractive force between the slide and the rail, countering the force direction of the air flow, thus providing a low-friction bearing film of compressed air. A linear motor included in the rail and slide member induces motion of the slide along the rail. In a second embodiment, the attractive force which counters the force direction of the air flow is provided by a vacuum in the rail which pulls the two slide member bearing surfaces toward the rail.

19 Claims, 4 Drawing Figures

LOW-FRICTION SLIDE APPARATUS FOR OPTICAL DISC TRANSLATION STAGE

This invention relates generally to low-friction slides and, more particularly, to a slide apparatus wherein a moving member slides along a stationary rail on a uniformly distributed film of compressed air.

BACKGROUND OF THE INVENTION

High density optical recording systems which may be used for recording and playing back information are known in the prior art. For example, U.S. Pat. No. 4,097,895, entitled "MULTI-LAYER OPTICAL RECORD," issued on June 27, 1978, to F. W. Spong, relates to an optical disc record/playback system wherein data are recorded on the surface of a recording medium. In a Spong system the thermal energy of a focused high intensity light beam causes variations of the optical properties on the surface of the recording medium. For example, in one system the thermal effects of a laser beam form pits in an absorptive coating on the surface of an optical disc. In the Spong system, approximately $10^{11}$ bits of information can be recorded on one side of a disc-shaped record medium having a thirty centimeter diameter.

In a typical optical recording/playback system, there are four sources of motive power used for generating relative motion between the information-bearing surface of the optical disc and the optical system including the light source and detectors. First, a motor drives the turntable on which the optical disc is fixedly mounted to impart rotational motion of the disc relative to a fixed position. Second, a translation stage, a part of which is the subject of the present invention, moves a portion of the optical system, including the focusing objective lens, radially across the disc, generally perpendicular to the information tracks. Third, a galvanometer located on the translation stage deflects a mirror so as to align a light beam through the focusing lens onto a selected track. In general, the translation stage may be thought of as the coarse movement and the galvanometer as the fine movement with regard to directing the record or playback beam onto a particular information track on the disc. Finally, a focus actuator, which may be a voice coil located on the translation stage, moves the focusing objective lens in a direction normal to the information-bearing surface of the disc.

The design of the translation stage is influenced by the need for smooth motion which is quickly and precisely responsive to a control signal. It is typically driven by a motor. In one prior art system, a feedscrew is adapted to be rotated in response to rotations of a motor shaft. The feedscrew is in mesh engagement with a bearing surface of the translation stage. When the motor is activated and the shaft rotated, the feedscrew causes the translation stage to move inwardly or outwardly along a radius of the disc record, depending on the direction of rotation of the motor shaft.

More recently, typical recording/playback systems have employed a linear electric motor in the translation stage to provide smoother and more precise operation. Typically, an inductive winding is energized by a current directed so as to induce the desired motion of the moving member carrying the translation stage. The direct drive of a linear motor lessens the mechanical interaction between driving force and translation stage, thereby providing a potentially smoother excursion of the translation stage.

Of greater significance to the smoothness of the excursion is the quality of bearing surface on which the translation stage rides. Air-supported translation stages or slides are well known and are currently widely available commercially. In these cases, air is typically supplied to the moving member where it is distributed through a plurality of orifices disposed about its inner walls so that there is a continuous film of compressed air between the sliding member and the rail. It is easily seen that if the air were to be supplied through orifices in the rail, then those orifices not positioned in alignment with the sliding member would be fully open and the system would require a large volume of air. In addition, if air were to be supplied through orifices in the rail, then as the sliding member started to enter upon an orifice, an instantaneous perturbation to the sliding member would result.

Nevertheless, there are also several disadvantages of a translation stage slide apparatus which supplies compressed air from the sliding member. First, such an arrangement requires that the sliding member be constructed about the rail, and it is very difficult to effect such a construction with the clearances (approximately 10 to 15 micrometers) required to maintain the air bearing surfaces. Second, since pressurized air is supplied to the sliding member, the air hose attached thereto will cause perturbations by the varying amount of drag as the sliding member traverses the rail. Third, if a linear motor is to be used to induce motion, space has to be made available between the rail and sliding member, thus sacrificing some of the air bearing area. This third-mentioned disadvantage can be alleviated by implementing a combined repelling/attracting arrangement (e.g., pressurized air and vacuum) at the side of the rail opposite the linear motor, but this arrangement merely compounds the second-mentioned disadvantage by adding the drag of a second hose.

SUMMARY OF THE INVENTION

In accordance with the principles of the present invention, a low-friction slide apparatus is disclosed. The apparatus includes a rail and strips having a multiplicity of pores which are affixed at one surface thereof to the rail on each of two sides along its longitudinal dimension. The rail further includes passages disposed along its longitudinal dimension in communication with the strips at their surfaces of affixation. The apparatus further includes means for providing pressurized air into the passages; the air passes through the pores of the strips. The apparatus additionally includes a movable member slidably mounted on the rail. The movable member has surfaces adjacent the two sides of the rail having porous strips. Finally, the apparatus includes means for providing an attractive force between each of the two sides of the rail having porous strips and the corresponding adjacent surfaces of the movable member. The attractive force causes compression of the air exiting the pores. The compressed air provides low-friction bearing films between the two sides of the rail and the corresponding adjacent surfaces of the movable member.

DETAILED DESCRIPTION OF THE PREFERRED EMBODIMENTS

Figure 1:
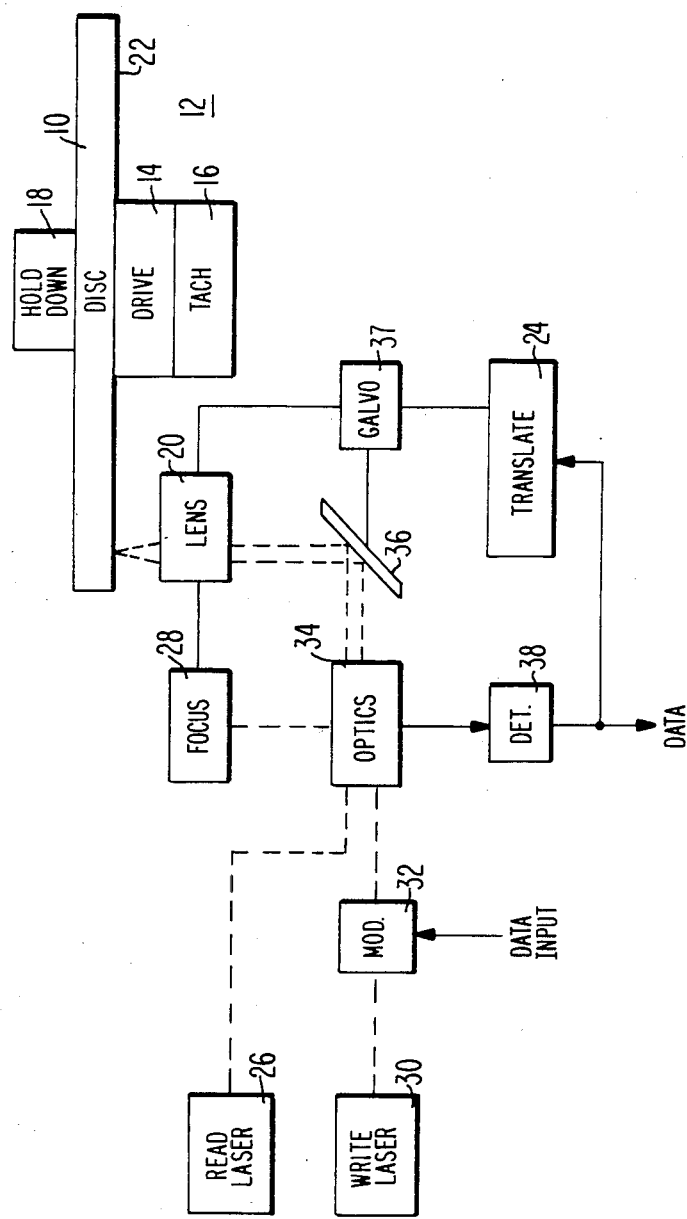
FIG. 1 illustrates, via a block diagram representation, an optical recording/playback system in which the present invention finds application.

Referring to FIG. 1, there is shown in block diagram form an optical recording/playback system. In operation, disc 10 is placed on turntable 12 which includes drive motor 14, tachometer 16 and hold down 18. After disc 10 is clamped in place, disc drive motor 14 is activated to rotate disc 10 at a predetermined angular speed, as measured by tachometer 16. Before a record or read operation can proceed, however, focus lens 20 must be positioned under the desired portion of the disc and arranged such that the light beams are focused onto surface 22 of disc 10. Lens 20 is positioned with respect to disc 10 by a motor driven translation stage 24.

When lens 20 is properly positioned with respect to the disc surface, read laser 26 is turned on so that a proper focus setting may be obtained. Focus is achieved by a servo loop (not shown) which operates using the light from the read laser 26 reflected from the disc surface 22. A lens positioner 28 maintains the focus distance from disc surface 22 during both record and read operations.

After focus has been achieved, the desired operation may be initiated. In the record mode, write laser 30 is activated. Data is clocked into modulator 32 which modulates the light that impinges on the disc surface 22 from laser 30. The modulated record beam is directed to disc 10 via optics 34 and mirror 36 operating under the control of galvanometer 37. The modulated record beam is focused on disc surface 22 to form a series of pits of varying duration and spacing as the disc 10 rotates. The resultant track that is formed contains the recorded information. When information is to be recorded in concentric tracks, recording in a subsequent track requires inactivating the write laser 30 for a short time while lens 20 is repositioned to a point on disc 10 where the next track is to be recorded. The repositioning takes place very quickly (for example, less than one millisecond) and may be accomplished by moving the galvanometer-controlled mirror 36 and translation stage 24. The translation stage 24 moves in increments (for example, four track spacings) and intermediate positions may be obtained by commanding the mirror 36 to tilt slightly. After repositioning takes place, write laser 30 is reactivated and a second track of data information is fed into modulator 32 for recording. This sequence will repeat for as long as data is available for recording. To ensure that the desired track may be found during read, a unique address is recorded within each track. It should be noted that the information may be recorded in a spiral track format on the disc surface 22 by moving translation stage 24 at a constant rate across the surface 22 of the disc 10.

In the read mode, the write laser 30 is turned off. When lens 20 is positioned and focus is achieved, the track servo is activated causing the read beam to lock onto the track nearest the center of the optical field of view. The track servo uses the galvanometer-controlled mirror 36 for steering the beam in response to the detected signal from detector 38. The difference between the track being followed and the desired track is used to reposition the mirror 36 and translation stage 24 to the location of the desired track. When the proper track is being read, the data may be outputed from detector 38 to suitable processing circuitry (not shown).

Figure 2:
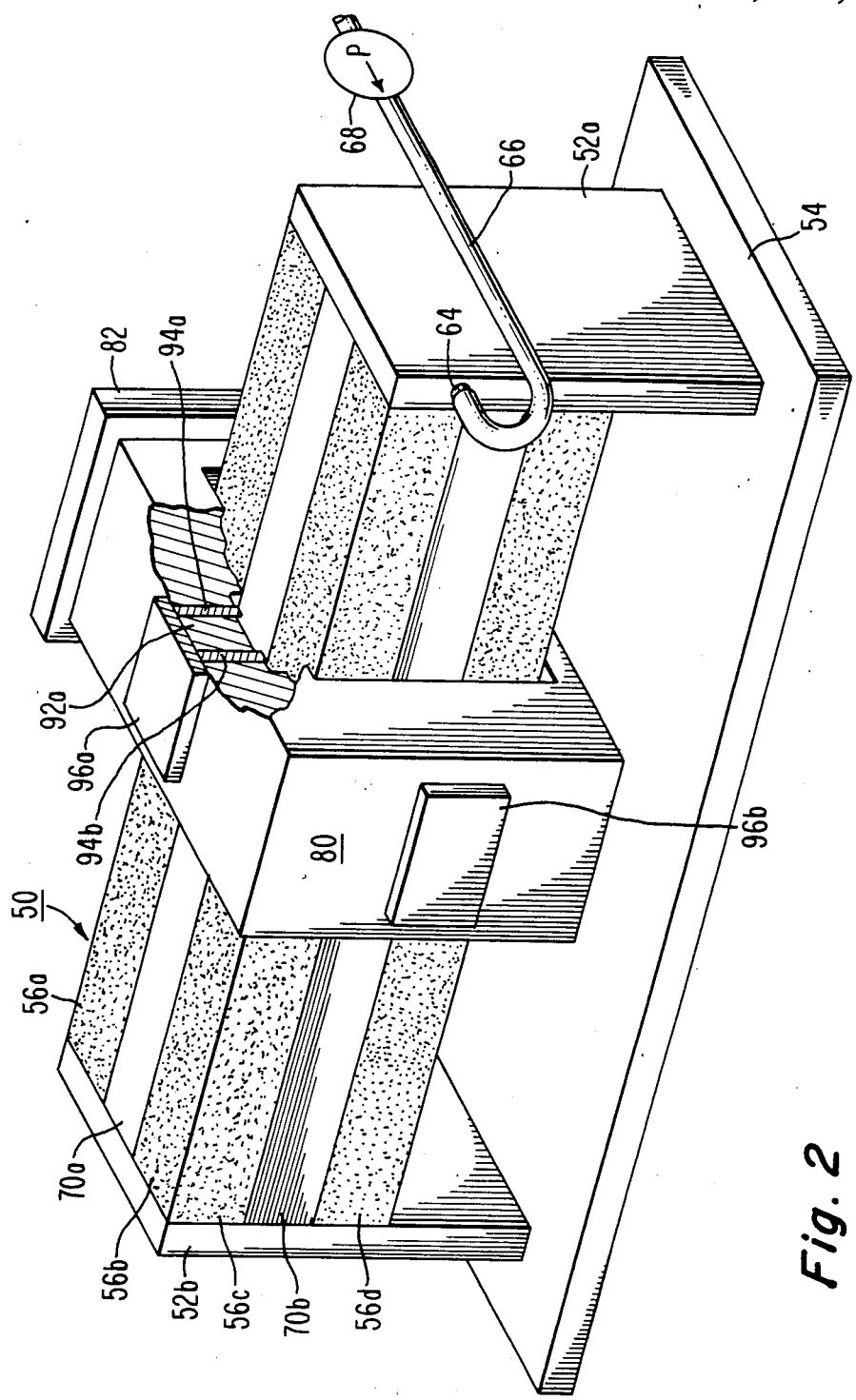
FIG. 2 illustrates a translation stage embodying the present invention.
Figure 3:
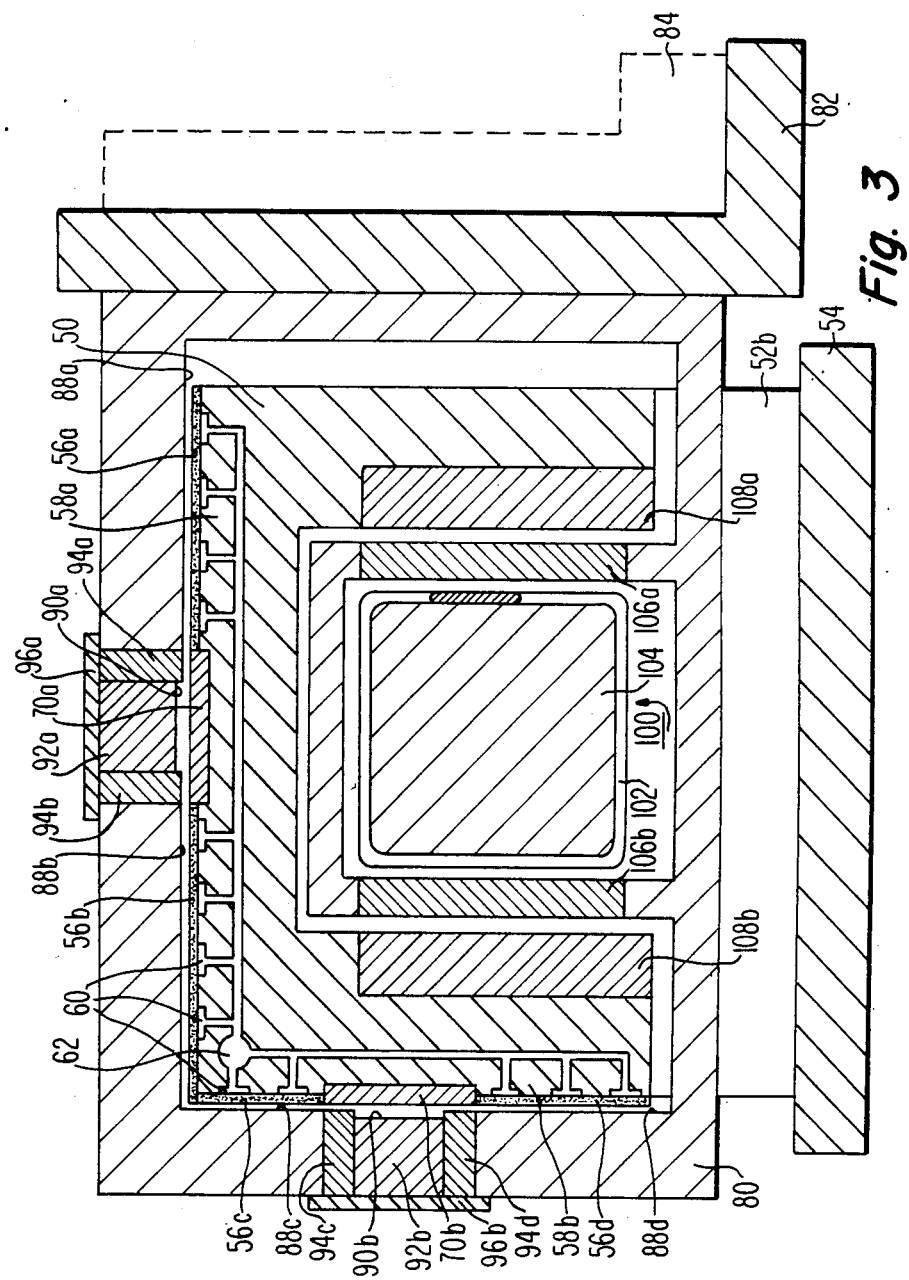
FIG. 3 is a cross-sectional view of the translation stage of FIG. 2 according to a first embodiment of the present invention.

Referring to FIG. 2, and to the FIG. 3 cross-sectional view thereof, there is shown a translation stage apparatus which embodies the principles of the present invention. The apparatus includes a rail 50, having a generally U-shaped cross-section with its channel directed downward. Rail 50 is fixedly supported at its ends by mounts 52a and 52b affixed to rigid platform 54. Porous strips 56a–d are affixed as shown along the length of orthogonal sides 58a and 58b of rail 50. Beneath strips 56a–d are a plurality of passages, collectively designated 60, disposed lengthwise along sides 58a and 58b of rail 50. Passages 60 are all interconnected via channel 62 which extends into rail 50, through end mount 52a, from hose fitting 64. Hose 66 is coupled between hose fitting 64 and a source of pressurized air 68, typically an air pump.

Strips 56a–d are fabricated of a porous, but extremely dense, material such as graphite having pores of a variety of diameters, up to 1 micrometer, and typically 0.1 micrometer. The thickness of each one of strips 56a–d may assume a value between 1.2 and 5 millimeters, typically 2.5 millimeters. Pressurized air which passes through the maze of pores emerges from the material with very low velocity.

Located generally centrally on each of the two orthogonal sides 58a and 58b of rail 50 are strips 70a and 70b, fabricated of a ferromagnetic material such as iron, which may be used as a return path for the flux lines of a magnetic field. The outer surfaces of side 58a, including porous strips 56a and 56b and ferromagnetic strip 70a, and of side 58b, including porous strips 56c and 56d and ferromagnetic strip 70b, are flush.

Slide member 80 is an open-ended, generally box-like structure constructed around rail 50, which includes a platform 82 for carrying elements 84 of the optical disc recording/playback system, not particularly shown, but typically including a plurality of optical devices. Along two of its sides, the inner surfaces 88a–d which correspond in position to porous strips 56a–d of rail 50, are perfectly flat. On surfaces 90a and 90b, in correspondence with ferromagnetic strips 70a and 70b of rail 50, there are located permanent magnets 92a and 92b, having pole pieces 94a–d. Permanent magnets 92a and 92b and pole pieces 94a–b and 94c–d are attached to caps 96a and 96b, respectively, which function as shoulders to maintain the gap separating the respective magnets 92a and 92b and pole pieces 94a–d from the ferromagnetic strips 70a and 70b.

A linear motor 100 comprises coil 102 wound helically about the entire length of core 104 which is rigidly mounted at its respective ends to mounts 52a and 52b. Linear motor 100 further comprises permanent magnets 106a and 106b attached to slide member 80 in close correspondence with coil 102. Finally, linear motor 100 comprises flux paths 108a and 108b attached to rail 50 in close correspondence with permanent magnets 106a and 106b, respectively.

Coil 102 is coupled to a controlled source of current (not shown) which induces motion in slide member 80 along rail 50 by generating a magnetic field through magnets 106a and 106b. Core 104 and flux paths 108a and 108b are fabricated of a ferromagnetic material, typically iron, which provides a ready path for the flux lines produced by the magnetic field from the current through coil 102. The gaps between coil 102 and permanent magnets 106a and 106b, and between magnets 106a and 106b and flux paths 108a and 108b, respectively, are typically 0.4 millimeters.

In its operation, the apparatus of FIGS. 2 and 3 receives a flow of air under pressure from air pump 68, via hose 66 and hose fitting 64, where it is distributed into passages 60 of rail 50 via chamber 62. The pressurized air in passages 60 seeps through the pores of porous strips 56a–d, where it forms a cushion of air in the gaps between the outer surfaces of sides 58a and 58b of rail 50 and inside surfaces 88a–d of slide member 80, respectively. The repelling force caused by the air seepage from the pores of strips 56a–d is countered by the attractive force between permanent magnets 92a and 92b and ferromagnetic strips 70a and 70b, respectively.

Because of the small diameters of the pores of strips 56a–d the total air flow through the apparatus is relatively small. Yet, there is sufficient flow to generate an air cushion which will serve as the air bearing film for purposes of supporting the slide member 80 and platform 82. By varying the air pressure applied in passages 60, the distance between slide member 80 and rail 50 may be adjusted to a desired value, typically 12 micrometers. The air pressure required for a typical apparatus as described herein may be 60 pounds per square inch (414 kilopascals). Slide member 80 may traverse rail 50 for a distance of up to 15 centimeters.

Figure 4:
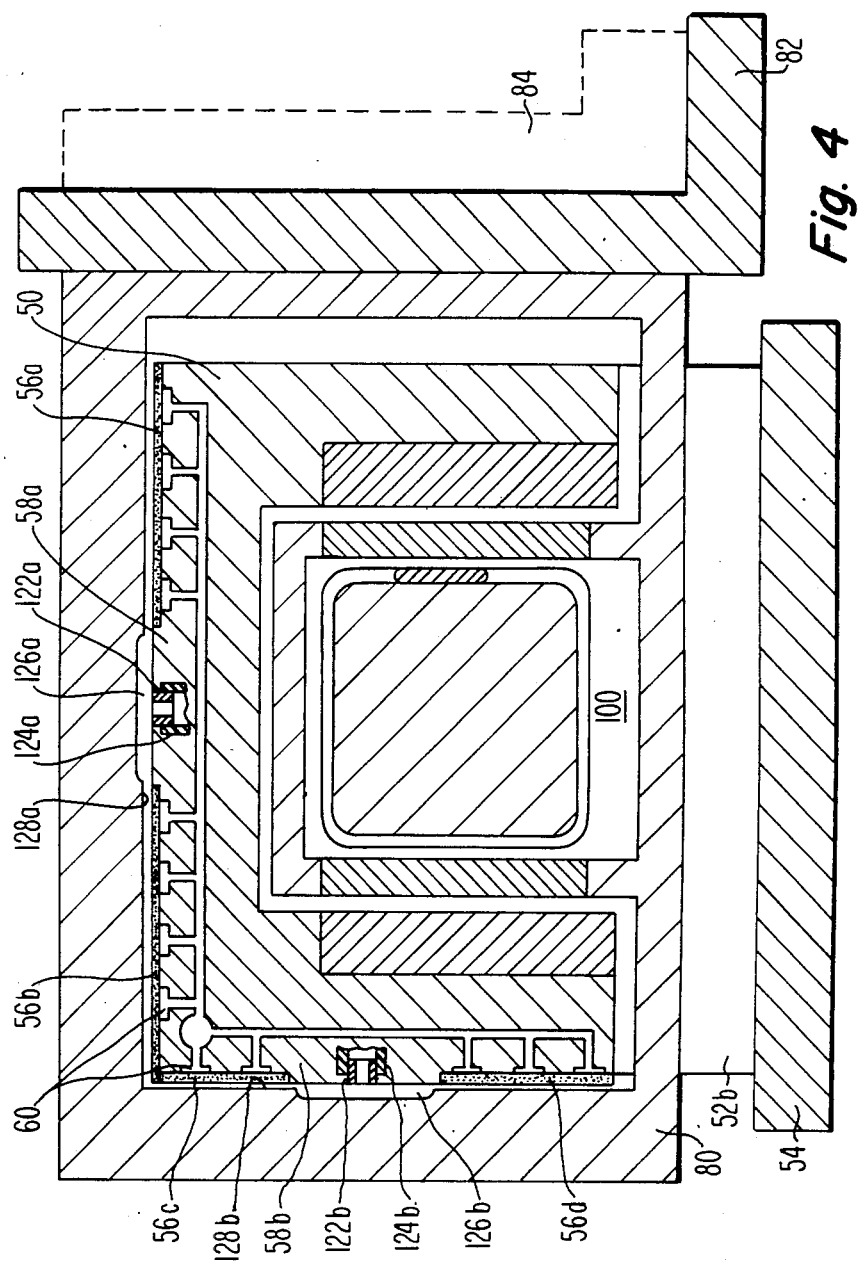
FIG. 4 is a cross-sectional view of the translation stage of FIG. 2 according to a second embodiment of the present invention.

In a second embodiment of the present invention, shown in cross section in FIG. 4, the attracting force is effected by a vacuum rather than by magnetism. In the FIG. 4 embodiment, the two strips of ferromagnetic material on sides 58a and 58b of rail 50 are replaced by hose fittings 122a and 122b and one end of hoses 124a and 124b, wherein the other ends of hoses 124a and 124b are coupled to a source of vacuum pressure (not shown), typically a vacuum pump. In place of the permanent magnets and pole pieces in slide member 80, this embodiment includes shallow cavities 126a and 126b on inner wall surfaces 128a and 128b in positional correspondence with vacuum hose fittings 122a and 122b, respectively. Cavities 126a and 126b may typically have a depth of 0.8 millimeters. In this embodiment, the attractive force of the vacuum balances the repulsive force of the pressurized air emerging through the pores in strips 56a–d.

The second embodiment has the disadvantage of requiring a vacuum line to the translation stage apparatus. Nevertheless, many optical disc recording/playback systems include several vacuum lines for use with, for example, a disc-to-turntable holding mechanism. On the other hand, since the vacuum pressure may be adjustable, this embodiment affords the advantage of providing a second adjustable control which may be used in determining the spring constant of the air cushion bearing, which is a function of the pressure of the air bearing and the spacing between the moving member and the rail. Finally, this embodiment may be slightly more responsive to commands for change in direction of the translation stage motion, as the magnetic attracting apparatus of the FIG. 3 embodiment has some slight amount of hysteresis associated with it, while the vacuum attracting apparatus of the FIG. 4 embodiment has none.

While the principles of the present invention have been demonstrated with particular regard to the illustrated structure of the figures, it will be recognized that various departures from such illustrative structure may be undertaken in the practice of the invention. As an example, the rectangular, U-shaped cross-sectional form of the rail illustrated in the figures is not the only configuration which will satisfy the teachings of the invention. The scope of this invention is therefore not intended to be limited to the structure disclosed herein but should instead be gauged by the breadth of the claims which follow.

What is claimed is:

1. A low-friction slide apparatus comprising:
   a rail;
   flat elongated strips having a multiplicity of pores, said strips affixed at one surface thereof to said rail on each of two substantially orthogonal sides along the longitudinal dimension of said rail;
   said rail further having passages disposed along its longitudinal dimension in communication with said strips at said surfaces of affixation;
   means for providing pressurized air into said passages, said air passing through said pores of said strips;
   a movable member slidably mounted on said rail, said movable member having substantially orthogonal surfaces adjacent said two substantially orthogonal sides of said rail; and
   means for providing attractive forces directed normally between each of said two sides of said rail and said corresponding adjacent surfaces of said movable member, said attractive forces causing compression of said air exiting said pores, said compressed air providing low-friction bearing films between said two sides of said rail and said corresponding adjacent surfaces of said movable member.

2. The apparatus according to claim 1 wherein the diameter of each of said pores is less than one micrometer.

3. The apparatus according to claim 1 wherein said strips are made of porous graphite.

4. The apparatus according to claim 2 wherein the dimension of each of said strips normal to said surface of affixation is between 1.2 and 5 millimeters.

5. The apparatus according to claim 1 wherein said means for providing attractive forces comprises:
   magnetic attracting means coupled to said moving means at said corresponding adjacent surfaces; and
   magnetic substances affixed to said two sides of said rail proximate said magnetic attracting means.

6. The apparatus according to claim 5 wherein said magnetic attracting means includes permanent magnets.

7. The apparatus according to claim 1 further including means for effecting sliding motion of said movable member relative to said rail.

8. The apparatus according to claim 7 wherein said motion effecting means includes a linear electric motor coupled to said movable member and to said rail.

9. The apparatus according to claim 8 wherein said linear motor comprises:
   first and second permanent magnets affixed to said movable member;
   a fixedly mounted coil helically wound about an axis parallel to the longitudinal dimension of said rail, said coil being positioned intermediate said permanent magnets and closely spaced thereto; and
   first and second strips of a magnetic substance affixed to said rail, said first and second strips in close proximity to said first and second permanent magnets respectively, and positioned remote from said coil.

10. A low-friction slide apparatus comprising:
a rail;
flat elongated strips having a multiplicity of pores, said strips affixed at one surface thereof to said rail on each of two substantially orthognal sides along the longitudinal dimension of said rail;
said rail further having passages disposed along its longitudinal dimension in communication with said strips at said surfaces of affixation;
means for providing pressurized air into said passage, said air passing through said pores of said strips;
a movable member slidably mounted on said rail, said movable member having substantially orthogonal surfaces adjacent said two substantially orthogonal sides of said rail; and
means for providing attractive forces directed normally between each of said two sides of said rail and said corresponding adjacent surfaces of said movable member, said attractive forces causing compression of said air exiting said pores, said compressed air providing low-friction bearing films between said two sides of said rail and said corresponding adjacent surfaces of said movable member, wherein said means for providing attractive forces further comprises means coupled to said rail for drawing a vacuum between said rail at said two sides and said movable member at said corresponding adjacent surfaces, said movable member further including cavities in said corresponding adjacent surfaces proximate said means for drawing a vacuum.

11. In an optical data processing system for use in recording or retrieving information signals, said information signals being recorded in tracks on a surface of an optical disc record, an apparatus comprising:
a light source for providing a beam of light;
a rail fixedly held at two spaced-apart positions on the longitudinal dimension of said rail;
strips having a mulitplicity of pores, said strips affixed at one surface thereof to said rail on each of two substantially orthognal sides along the longitudinal dimension of said rail;
said rail further having passages disposed along its longitudinal dimension in communication with said strips at said surfaces of affixation;
means for providing pressurized air into said passages, said air passing through said pores of said strips;
a movable member slidably mounted on said rail between said spaced-apart positions, said movable member including means for directing said beam of light on said surface of said optical disc record, said movable member being adapted to move radially with respect to said disc record and generally parallel to said surface, said movable member having substantially orthogonal surfaces adjacent said two substantially orthogonal sides of said rail;
means for effecting sliding motion of said movable member relative to said rail; and
means for providing attractive forces directed normally between each of said two sides of said rail and said corresponding adjacent surfaces of said movable member, said attractive forces causing compression of said air exiting said pores, said compressed air providing low-friction bearing films between said side of said rail and said corresponding adjacent surfaces of said movable member.

12. The apparatus according to claim 11 wherein the diameter of each of said pores is less than one micrometer.

13. The apparatus according to claim 11 wherein said strips are made of porous graphite.

14. The apparatus according to claim 12 wherein the dimension of each of said strips normal to said surface of affixation is between 1.2 and 5 millimeters.

15. The apparatus according to claim 11 wherein said means for providing attractive force comprises:
magnetic attracting means coupled to said moving means at said corresponding adjacent surfaces; and
magnetic substances affixed to said two sides of said rail proximate said magnetic attracting means.

16. The apparatus according to claim 15 wherein said magnetic attracting means includes permanent magnets.

17. The apparatus according to claim 11 wherein said motion effecting means includes a linear electric motor coupled to said movable member and to said rail.

18. The apparatus according to claim 17 wherein said linear motor comprises:
first and second permanent magnets affixed to said movable member;
a fixedly mounted coil helically wound about an axis parallel to the longitudinal dimension of said rail, said coil being positioned intermediate said permanent magnets and closely spaced thereto; and
first and second strips of a magnetic substance affixed to said rail, said first and second strips in close proximity to said first and second permanent magnets respectively, and positioned remote from said coil.

19. In an optical data processing system for use in recording or retrieving information signals, said information signals being recorded in tracks on a surface of an optical disc record, an apparatus comprising:
a light source for providing a beam of light;
a rail fixedly held at two spaced-apart positions on the longitudinal dimension of said rail;
flat strips having a multiplicity of pores, said strips affixed at one surface thereof to said rail on each of two substantially orthogonal sides along the longitudinal dimension of said rail;
said rail further having passages disposed along its longitudinal dimension in communication with said strips at said surfaces of affixation;
means for providing pressurized air into said passages, said air passing through said pores of said strips;
a movable member slidably mounted on said rail between said spaced-apart positions, said movable member including means for directing said beam of light on said surface of said optical disc record, said movable member being adapted to move radially with respect to said disc record and generally parallel to said surface, said movable member having substantially orthogonal surfaces adjacent said to substantially orthogonal sides of said rail;
means for effecting sliding motion of said movable member relative to said rail; and
means for providing attractive forces directed normally between each of said two sides of said rail and said corresponding adjacent surfaces of said movable member, said attractive forces causing compression of said air exiting said pores, said compressed air providing low-friction bearing films between said two sides of said rail and said corresponding adjacent surfaces of said movable member, wherein said means for providing attractive forces further comprises means coupled to said rail for drawing a vacuum between said rail at said two sides and said movable member at said corresponding adjacent surfaces, said movable member further having cavities in said corresponding adjacent surfaces proximate said means for drawing a vacuum.

* * * * *